United States Patent [19]
Graffy et al.

[11] Patent Number: 5,732,996
[45] Date of Patent: Mar. 31, 1998

[54] TAILGATE STEP

[76] Inventors: Thomas Graffy; Stepan Gevorkyan, both of 7032 Alondra Blvd., Paramount, Calif. 90723

[21] Appl. No.: 641,527
[22] Filed: May 1, 1996
[51] Int. Cl.⁶ ................................................ B60R 3/02
[52] U.S. Cl. ................................... 296/62; 280/166
[58] Field of Search ...................... 296/62, 50; 280/166, 280/163; 182/90, 91; 105/443, 447

[56] References Cited

U.S. PATENT DOCUMENTS

| | | | |
|---|---|---|---|
| 4,191,388 | 3/1980 | Barksdale | 296/62 X |
| 4,639,032 | 1/1987 | Barbour | 296/62 |
| 4,757,876 | 7/1988 | Peacock | 296/62 X |
| 4,846,487 | 7/1989 | Criley | 296/62 X |
| 5,205,603 | 4/1993 | Burdette, Jr. | 296/62 |

*Primary Examiner*—Joseph D. Pape
*Attorney, Agent, or Firm*—Freilich, Hornbaker & Rosen

[57] ABSTRACT

A tailgate step has a hinge assembly and a step assembly. One side of the hinge assembly attaches to the inside panel of the tailgate near its upper edge. The other side of the hinge assembly attaches to the step frame. In one form, Z pins connect the two sides of the hinge assembly. The step frame is U shaped where the bight of the U is the step portion. The tailgate step has a stored position against the inside panel of the tailgate and an in-use position across the tailgate edge and vertically downward when the tailgate is open.

4 Claims, 4 Drawing Sheets

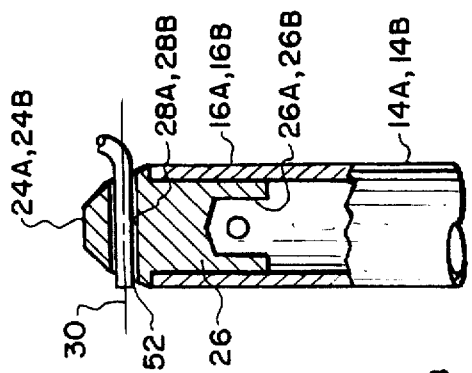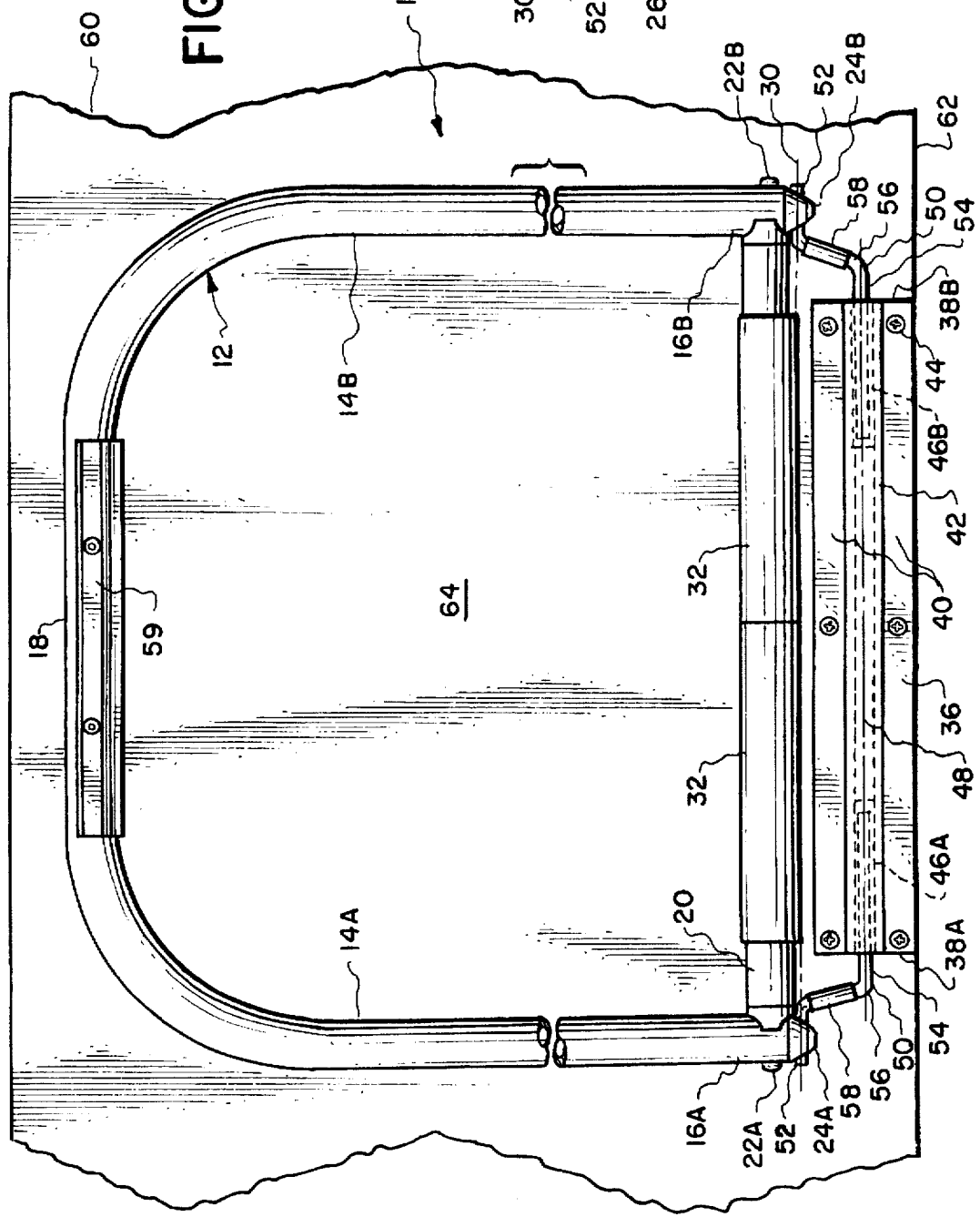

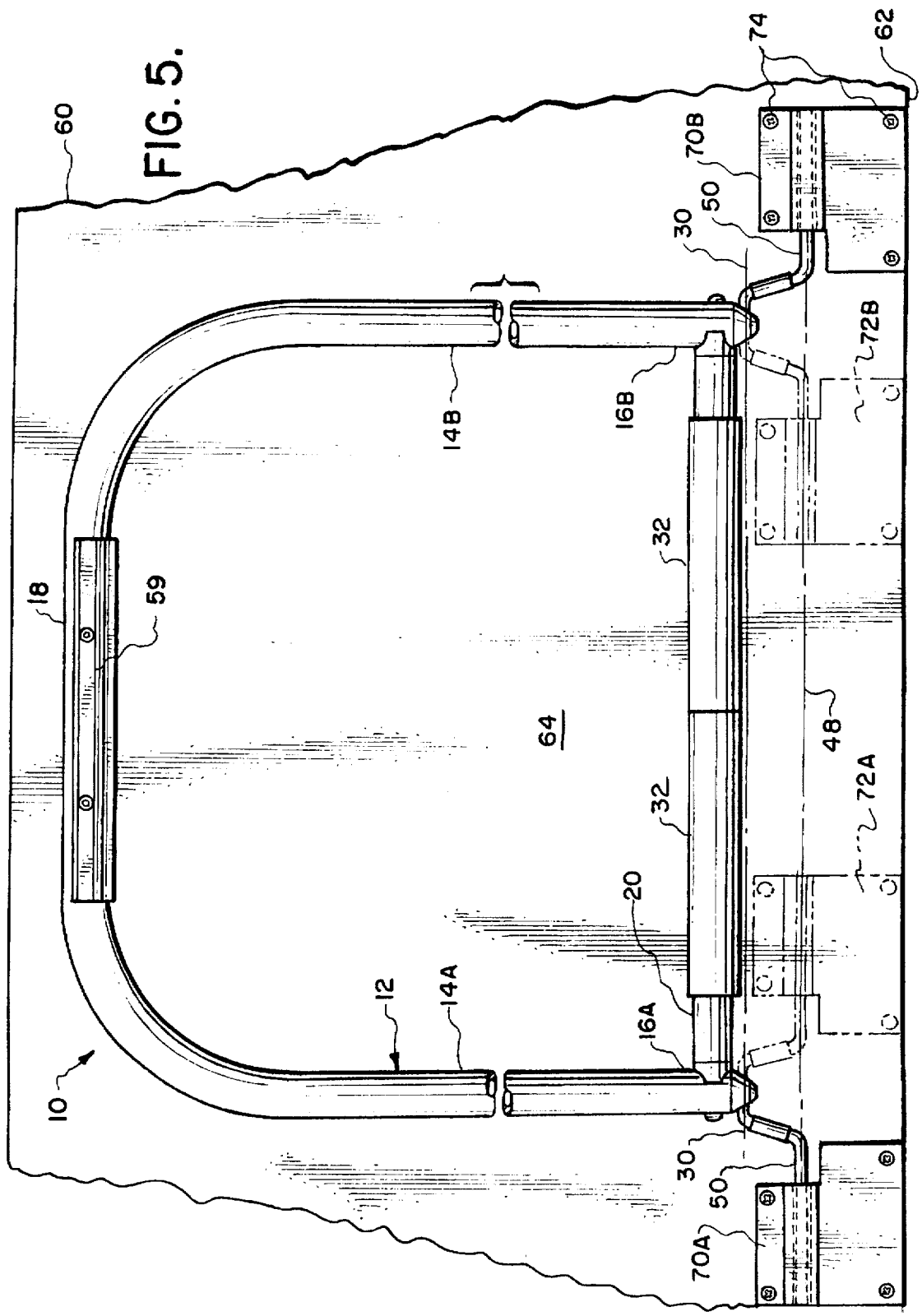

TAILGATE STEP

BACKGROUND OF THE INVENTION

This invention relates to a step device to be attached to the tailgate of a truck which has a stored position and an in-use or deployed position.

The height of a truck tailgate is often inconvenient or for some people difficult or impossible to traverse for entry to and exit from the truck bed, or to assist in moving things on and off the truck. A step is desirable which is permanently attached to the truck, is of simple inexpensive construction, has a convenient storage position, takes up little space and is easily deployed to an in-use position.

U.S. Pat. 4,191,388 shows a tailgate step including a plate mounted against the inside surface of the tail gate and a step support which is pivotally mounted on upstanding flanges, offset positioning being accomplished by a curved end of the step support. U.S. Pat. 4,556,125 shows a vehicle ladder in which offsetting is accomplished by a cantilever section. U.S. Pat. 4,639,032 shows a retractable pivoting mechanism.

Other mechanisms of interest are shown in U.S. Pat. Nos. 1,181,367; 2,037,805; 2,324,507; 2,568,093; 3,357,719; 3,627,350, 3,826,337; 3,951,431; 3,961,809; 4,943,085; 5,007 654; 5,046 582.

SUMMARY OF THE INVENTION

The tailgate step comprises a step frame and a hinge assembly. One side of the hinge assembly attaches to the inside of the truck tailgate near its upper edge. The other side of the hinge assembly is integral to the step frame. In one form the hinge assembly defines offset axes in which there are spaced apart parallel axes. One axis, the one attached to the step frame can translate from a position outboard of the tailgate edge to a position on the tailgate that is inboard of the tailgate edge. This axis in addition to translational movement allows the step frame to pivot from an in use position to a stored position. The translation can be effected by a variety of means. In one embodiment the translation is accomplished by the second axis being pivoting. The second axis is fixed to the tailgate. The two axes are spaced apart and parallel. In this case the two axes remain spaced apart during the translation action. In one position the step frame is stored against the inside panel of the tailgate. In the other position, the step frame is pivoted around the second axis to extend beyond the edge of the tailgate, and by pivoting on the first axis extends vertically downward when the tailgate is down. In another embodiment the translation is effected through sliding by which the pivoting axis slides from the outboard position to the inboard, stored position. The step frame has a step for a person to step on to access the truck bed. One implementation of this embodiment uses hinge pins joined by a rigid connecting member which keeps the two axes spaced apart. In another implementation of this embodiment, the two pivot axes are connected by linkage arms, with spaced apart hinge pins being connected to ends of the linkage arms. This embodiment in its various implementations provides for offset pivoting in which there is independent pivoting about each of the parallel pivoting axes so that the step frame can both pivot and traverse an arc, thus translating the step pivot from its in use outboard position to its stored inboard position. In another embodiment, the step pivot is at one end of a slider arm, which, instead of pivoting at the tailgate axis slides on a pin at that axis position so that translation is accomplished by sliding and the step pivots on the step pivot axis.

BRIEF DESCRIPTION OF DRAWINGS

FIG. 1 shows the tailgate step in stored position.

FIG. 2 shows a partial sectional view of the detail of the hinge and pin assembly associated with the step portion.

FIG. 5 shows an alternative construction in stored position.

DETAILED DESCRIPTION

Figure 3:
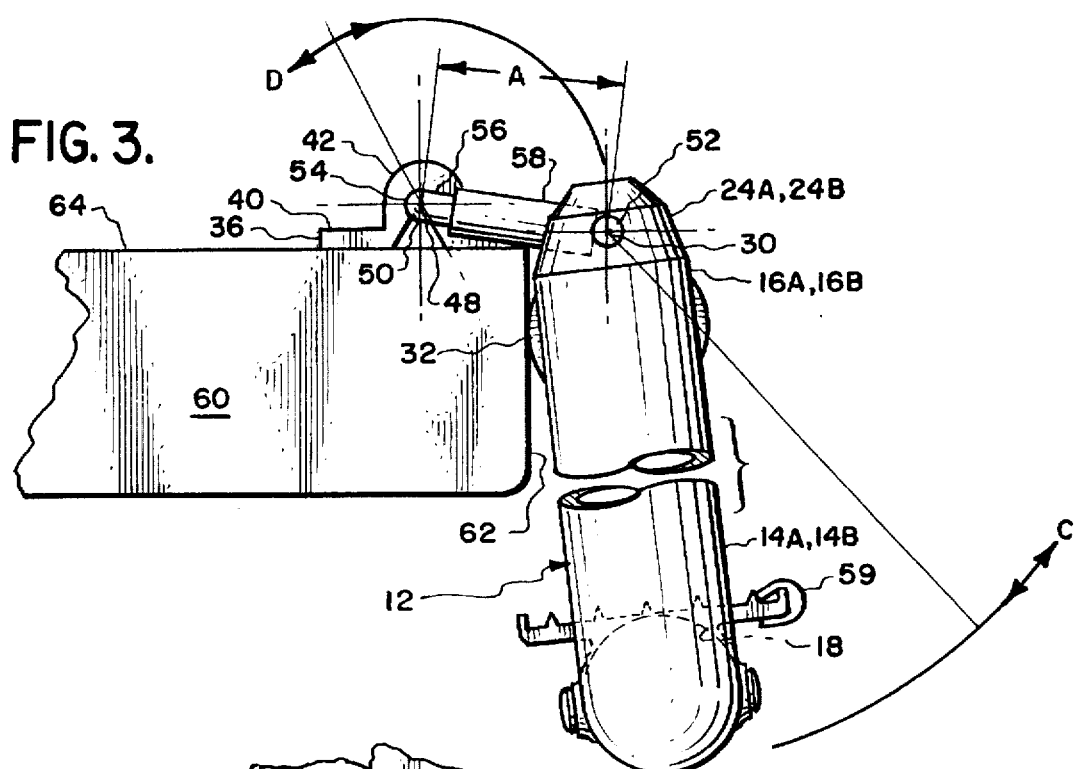
FIG. 3 shows a partial view of the tailgate step in its in-use position.

Referring to FIGS. 1, 2, 3, and 4, the tailgate step 10 comprises the following parts. A frame 12 of tubular aluminum is formed into a U shape. The frame 12 has left and right legs 14A and 14B, respectively, each having upper leg ends 16A and 16B. The legs 14A, 14B are joined at their lower ends by a beam or bight portion 18 forming the bottom of the U shape. Across the legs 14A, 14B, near the upper leg ends 16A, 16B is a brace 20, held in place by an anchoring means 22A, 22B. Set on the upper leg ends 16A, 16B are bearing blocks 24A, 24B which define the step side of a hinge assembly. The bearing blocks 24A, 24B are held onto the upper leg ends 16A, 16B by a second anchoring system 26 which comprises a pin bearing extension 26A, 26B which extends inside the tubular upper legs ends 16A, 16B. The bearing blocks 24A, 24B have reamed holes 28A, 28B which can extend all the way through, or can be blind-stopped at a selected depth defining a step or frame bearing for each of the left and right legs 14A, 14B. The axes of the bearings 28A, 28B for both the right and left side are co-extensive and define a first hinge axis 30, also referred to as the step hinge axis. Thus the entire step frame 12 can pivot about the step hinge axis 30. A plastic or rubber bumper 32 is fitted on the base 20 (actually two pieces are used).

A tailgate bearing block 36 extends generally between the frame legs 16A, 16B defining the tailgate side of an offset hinge assembly. The tailgate bearing block 36 is an elongated form, which is conveniently made from an extrusion and has a left end 38A a right end 38B. It has mounting flanges 40 and a block portion 42, which extends its entire length. The flanges have holes 44 which are used to secure the tailgate bearing block 36 to a truck tailgate by fasteners such as sheet metal screws. The portion of the bearing block 42 at the left end 38A and the right end 38B is reamed to size to provide a left tailgate bearing 46A and a right tailgate bearing 46B. The axes of the left and right tailgate bearings 46A and 46B are co-extensive to define a second hinge axis 48, also referred to as the tailgate hinge axis. The tailgate hinge axis 48 and the step hinge axis 30 are spaced apart and parallel.

Hinge pivot rod 50, also called Z pins 50 have hinge pin portions 52 and 54 and a connection portion 56. The hinge pin portions 52 and 54 of the Z pins provide the hinge pins respectively associated with the pivot axes 30 and 48 of the offset hinge assembly. That is, hinge pin portions 52 are the hinge pins for the step hinge portion and hinge pin portions 54 are the hinge pins for the tailgate hinge portion, together these portions constituting the offset hinge assembly. As seen two of the hinge pivot rods 50 are used, one on each side of the step frame.

A rubber or plastic bumper 58 is fitted on the connection portions 56.

A step 59 is attached to the beam 18, such as by riveting.

When assembled and installed as seen in FIGS. 1, 2, 3 and 4, the tailgate bearing block 36 is fastened through holes 44 to a selected point along the length of a tailgate 60. It must be positioned proximate and parallel to the upper edge 62 of the tailgate to permit its function as will be explained. Thus the term inboard means inside the upper edge 62 and term outboard means outside the upper edge 62.

The Z pins 50 have their hinge pin portions 52 set into the bearing blocks 24A, 24B (in reamed holes 28A, 28B) and their hinge pin portions 54 set into the bearings 46A and 46B. The hinge pins 52 and 54 independently rotatable in their respective bearings and establish the offset distance A (seen in FIG. 3) between the axes 30 and 48, that distance being fixed by the length of connection portion 56.

Therefore the frame 12 pivots about axis 30 on hinge pin portions 52 as well as about axis 48 on hinge pin portions 54. This is illustrated in FIG. 3 by arrows C and D.

Figure 4:
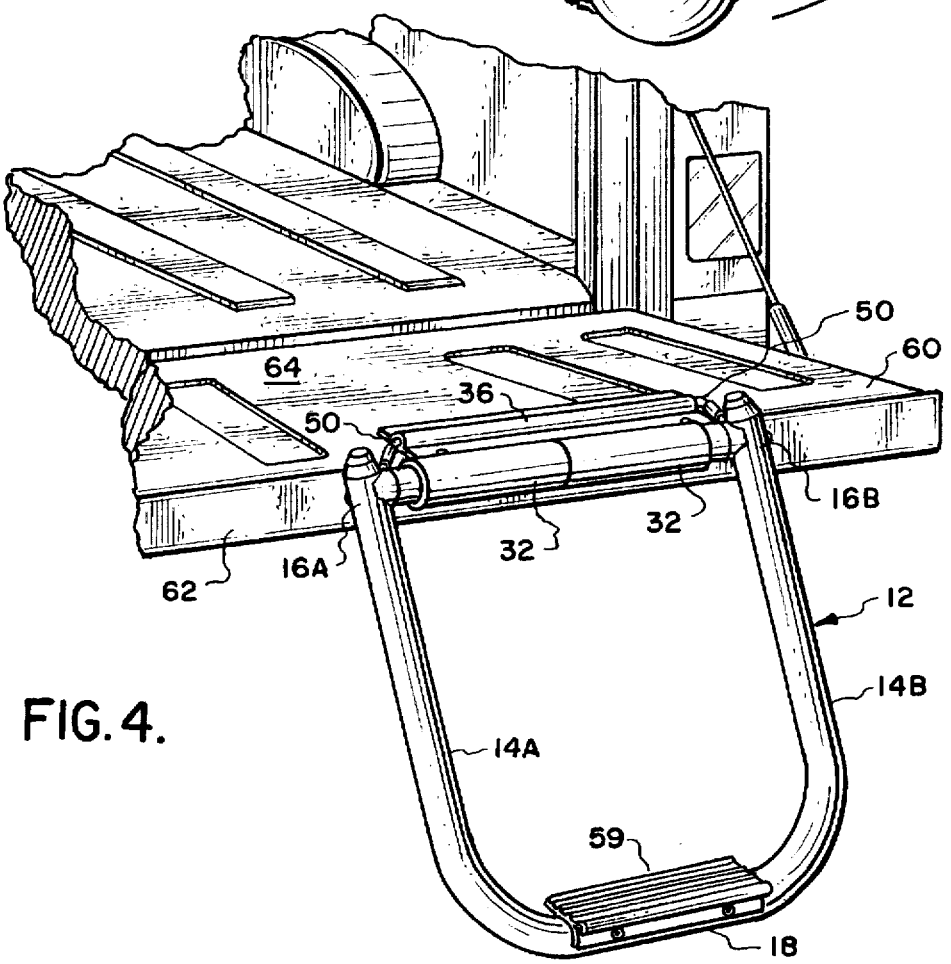
FIG. 4 shows a perspective view of the tailgate step in its in-use position.

As installed for use, the tailgate step 10 has a stored position and an in-use position. The stored position is shown in FIG. 1, in which the frame 12 is resting against and generally parallel to the interior panel 64 of the tailgate. Although no means is shown for holding it in place, it is an alternative to provide a clip or other hold-down means to keep it from banging around. The in-use position is shown in FIGS. 3 and 4. To get from the stored position of FIG. 1 to the in-use position of FIG. 3, the frame is pivoted about each of axis 30 and axis 48 as seen by arrows C and D (FIG. 3) until it reaches the fully rotated in-use position as shown. As seen with the tailgate 60 dropped to the open horizontal position, the deployed, in-use position has the frame 12 in an outboard position extending generally vertically downward and adjacent the tailgate upper edge 62, placing the step 59 to present a flat generally horizontally oriented stepping surface, while the bumper 32 leans against the tailgate edge 62.

Referring again to FIGS. 3 and 4, and with the stored and in-use positions appreciated, it can be seen that the tailgate hinge axis 48 must be placed a distance away from the tailgate upper edge 62, but close enough so that the frame 12 will swing clear and then rest against the tailgate upper edge 62 to take on the vertical position. The length of a Z pin 50 connection portion 56 controls this position. The Z pin connection portion 56 will bear on the tailgate, resisting the vertical force on the step, the bumper 58 protecting the tailgate surface from scratching.

FIG. 5 shows an alternative embodiment in which the step hinge portion of the hinge assembly is provided as two separate parts 70A and 70B, being mirror images of each other, and which are installed exteriorly of the frame assembly 12. Hinge pivot rods 50, or Z pins 58 are used. An alternative to this is shown in phantom lines in which two separate parts 72A and 72B being mirror images of each other, are installed interiorly of the frame assembly 12. These alternative hinges are secured to the tailgate by screws 74. These alternatives still define offset hinge axes 30, and 48, and the assembly functions the same as described above.

Figure 6:
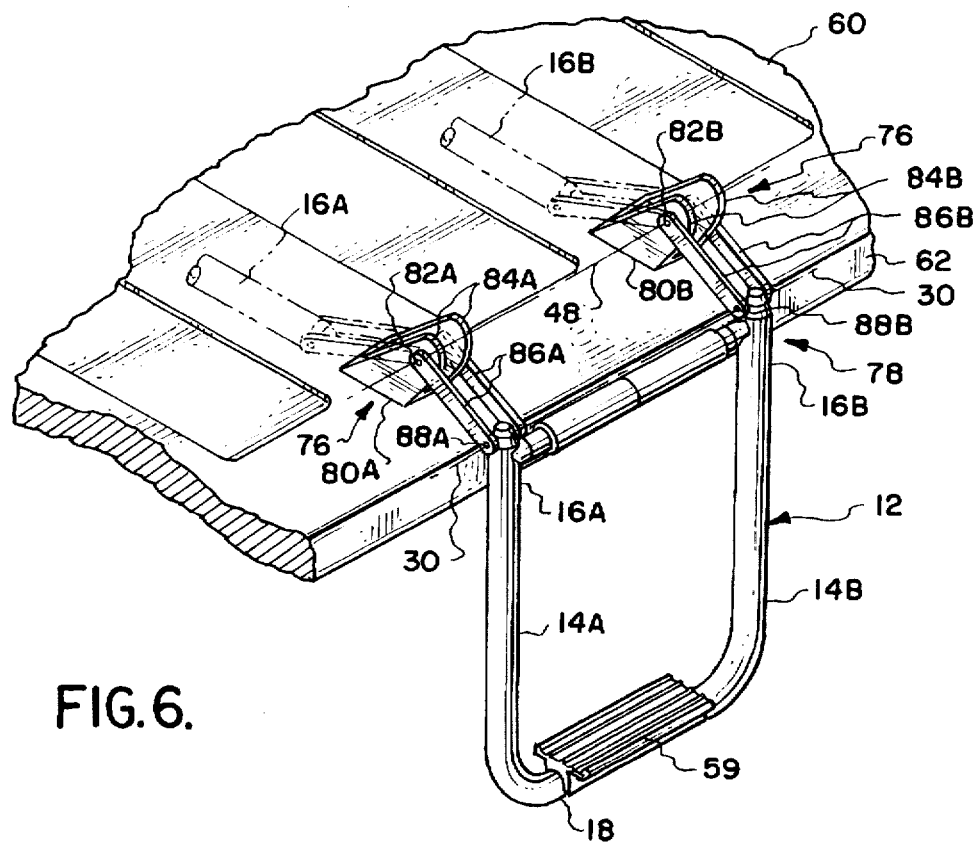
FIG. 6 shows an alternative construction in in-use position.

FIG. 6 shows a further alternative construction. In this case the hinge assembly has a tailgate portion 76 and a step portion 78. A pair of spaced apart twin-gusset brackets 80A and 80B are attached to the tailgate 60 and have tailgate hinge pins 82A and 82B mounted on the twin-gusset elements 84A and 84B, which define the axis 48. From each of the twin-gusset elements 84A and 84B, a pair of linkage arms 86A and 86B are pivotally mounted on the respective hinge pins 82A and 82B. The spacing of the arms of each linkage arm pair 110B 86A and 86B such that the leg upper ends 16A, 16B easily fit between them. Then step hinge pins 88A and 88B, extend through the arm pairs 86A and 86B and leg upper ends 16A and 16B, respectively, to define the axis 30. This construction operates as described above with the stored position shown in phantom lines.

Figure 7:
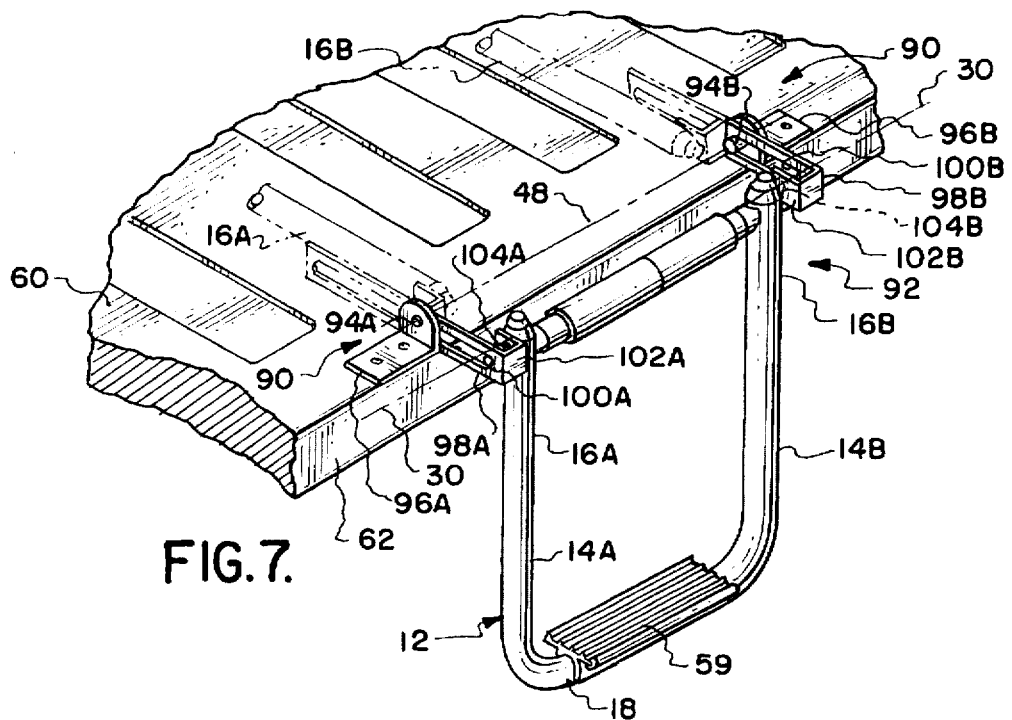
FIG. 7 shows an alternative construction in in-use position.

FIG. 7 shows a further alternative structure. In this case, the hinge assembly has a tailgate portion 90 and a step portion 92. Pins 94A and 94B are attached to base brackets 96A and 96B which define the axis 48 and extend inwardly between the two brackets. Slider arms 98A and 98B have slots 100A and 100B. The slots 100A and 100B slidingly receive the pins 94 A and 94B, respectively. At the outer end of the slider arm 98A and 98B, mounting brackets 102A and 102B are present. The step frame leg upper ends 16A, 16B are fitted adjacent to the mounting brackets 102A and 102B. Between the step frame leg upper ends 16A, 16B and the mounting brackets 102A and 102B are hinge pins 104A and 104B, which define the axis 30.

FIG. 7 shows this construction in solid lines in the in-use position. The stored position is shown in phantom lines. In the stored position, the slider arms 98A, 98B are moved, sliding along the hinge pins 94A, 94B in the slots 100A, 100B to the opposite end of the slots 100A, 100B. In this case there is no pivoting about axis 48. Axis 30 moves from a position outboard of the tailgate 60, that is beyond the tailgate upper edge 62 extending along the tailgate panel, to a position within the periphery of the tailgate 60, that is inside the tailgate upper edge 62. It is preferably configured so that, in the stored position axis 48 and 30 coincide or at least come close together. This gives a more compact stored position.

As can be seen, the apparatus operates by placing the axis 30 outboard of the tailgate upper edge 62, so that the step frame can pivot to the vertical in use position. For the stored position the axis 30 translates from the outboard position to a position inboard of the tailgate upper edge 62.

In the forms shown in FIG. 1–6, the pivoting of the frame 12 about axis 48 establishes a translation distance 2A (which is twice the distance between the axes 48 and 30). This translation is accomplished by pivoting the frame from the vertical in use position about 270 degrees, about a circle, whose center is axis 48, of a radius A, to its stored position extending along the tailgate panel. The pivoting about axis 30 allows the frame to take on the desired orientation in each of the two positions. By use of the spaced apart pivot axes 48 and 30 a lower profile for the entire structure is enabled, as well as the positioning and orientation ability.

In other words, it could be said that axis 48 establishes a base pivot on a circle of radius A and the other axis 30 resides in the circumference of the circle. This type of structure is seen in the embodiments of FIGS. 1–6. For convenience, this type of structure, is called herein an offset axis double pivoting hinge assembly. It produces the translation of axis 30 from the outboard, in use position extending vertically downward to the inboard stored position extending along the tailgate panel by pivoting from the downward extending vertical position, through about 270° to the horizontal position against the tailgate panel. One side of the hinge respectively comprises for one implementation tailgate bearing 42 (FIG. 1–4), and for another implantation, parts 70A and 70B (FIG. 5), and for another implementation twin-gusset brackets 80A and 80B (FIG. 6). The other side of the hinge respectively comprises frame 12 (in particular the leg upper ends 16A, 16B which contain bearings 28A, 28B) and axis 30. Each alternative structure of FIGS. 1–6 also contain a linkage element which defines the translation distance 2A, being respectively connection leg 56 (FIGS. 1–5), and hinged arm pairs 86A and 86B (FIG. 6).

The embodiment of FIG. 7 is somewhat different in that the translation of axis 30 does not occur through pivoting but rather through linear movement by reason of slider arms 98A and 98B sliding from the in use position of axis 30 outboard of tailgate edge 62 to the stored position of axis 30 inboard of tailgate edge 62. In this case the distance between axis 48 and axis 30 changes in the translation action whereas in the form of FIGS. 1–6, axis 48 and axis 30 remain at a fixed distance apart. The change of the distance between axis 48 and axis 30 at the extremes of the translation movement depend on the dimensions which establish the amount of sliding in the slots 100A and 100B.

Although particular embodiments of the invention have been described and illustrated herein, it is recognized that modifications and variations may readily occur to those skilled in the art, and consequently it is intended that the claims be interpreted to cover such modifications and equivalents.

What is claimed is:

1. A step assembly useful with a tailgate supported for hinged movement between a horizontally oriented down position and a vertically oriented up position, said step assembly including a step frame mounted for movement relative to said tailgate between a deployed position and a stored position, said step assembly comprising:

a bearing block configured for attachment to the inner surface of a tailgate proximate to the tailgate upper edge, said bearing block defining a tailgate hinge axis;

said step frame comprising first and second elongate legs oriented parallel to, and horizontally spaced from, one another, each of said legs defining an upper end and a lower end;

a step member connected between said first and second legs proximate to the lower ends thereof;

first and second step bearings respectively located on said first and second legs proximate to the upper ends thereof and defining a step hinge axis;

first and second pivot rods each comprising an integral member defining first and second hinge pins oriented substantially parallel to and offset from one another; and wherein said first and second pivot rod first hinge pins are coupled to said bearing block for rotation through approximately 270° about said tailgate hinge axis; and said first and second pivot rod second hinge pins are respectively coupled to said first and second step bearings for allowing rotation of said step frame relative to said step hinge axis;

whereby when said tailgate is in said down position, said step frame is movable between (1) a deployed vertically oriented position with said step hinge axis outboard of said tailgate upper edge and said step member vertically below said step hinge axis and (2) a stored horizontally oriented position with said step hinge axis inboard of said tailgate upper edge and said step member proximate to the inner surface and lower edge of said tailgate.

2. The step assembly of claim 1 wherein each of said pivot rods comprises an essentially Z-shaped member defining a central connecting portion having said first and second hinge pins extending in opposite directions therefrom.

3. The step assembly of claim 1 wherein said step frame is comprised of a tubular member bent to form a U-shape defining said first and second elongate legs and said step member.

4. The step assembly of claim 1 wherein each of said legs has a length greater than two times the offset between said hinge pins.

\* \* \* \* \*